(12) United States Patent
Sharma et al.

(10) Patent No.: US 10,286,498 B2
(45) Date of Patent: May 14, 2019

(54) LEAD-FREE SOLDER ALLOY COMPOSITION AND METHOD FOR PREPARING LEAD-FREE SOLDER ALLOY

(71) Applicant: KYUNG DONG ONE CORPORATION, Seoul (KR)

(72) Inventors: Ashutosh Sharma, Seoul (KR); Jae Pil Jung, Seoul (KR); Jong Hyun Yoon, Cheonan-si (KR); Bum Gyu Baek, Asan-si (KR); Heung Rak Sohn, Seoul (KR); Song Hee Yim, Pyeongtaek-si (KR); Jong Hyuk Yoon, Pyeongtaek-si (KR)

(73) Assignee: KYUNG DONG ONE CORPORATION, Seoul (KR)

( * ) Notice: Subject to any disclaimer, the term of this patent is extended or adjusted under 35 U.S.C. 154(b) by 128 days.

(21) Appl. No.: 15/502,994

(22) PCT Filed: Aug. 18, 2015

(86) PCT No.: PCT/KR2015/008611
§ 371 (c)(1),
(2) Date: Feb. 9, 2017

(87) PCT Pub. No.: WO2016/028058
PCT Pub. Date: Feb. 25, 2016

(65) Prior Publication Data
US 2017/0225277 A1    Aug. 10, 2017

(30) Foreign Application Priority Data

Aug. 18, 2014 (KR) ........................ 10-2014-0107209

(51) Int. Cl.
*C22C 1/02* (2006.01)
*B23K 35/26* (2006.01)
(Continued)

(52) U.S. Cl.
CPC ............ *B23K 35/262* (2013.01); *B23K 35/26* (2013.01); *B23K 35/3601* (2013.01); *C22C 1/02* (2013.01); *C22C 13/00* (2013.01)

(58) Field of Classification Search
CPC .. B23K 35/262; B23K 35/3601; B23K 35/26; C22C 1/02; C22C 13/00
See application file for complete search history.

(56) References Cited

U.S. PATENT DOCUMENTS

2010/0200271 A1    8/2010   Arvin et al.
2014/0199115 A1    7/2014   de Avila Ribas et al.

FOREIGN PATENT DOCUMENTS

CN    101480763 A    7/2009
CN    103639614      3/2014
(Continued)

OTHER PUBLICATIONS

Notification of Reasons for Refusal for Japanese Patent Application No. JP 2017-528750, dated Mar. 20, 2018, 9 Pages.
(Continued)

*Primary Examiner* — Anthony J Zimmer
(74) *Attorney, Agent, or Firm* — Fenwick & West LLP

(57) ABSTRACT

This invention relates to a lead-free solder alloy composition and a method of preparing a lead-free solder alloy, wherein the lead-free solder alloy composition includes a ceramic powder added to a lead-free solder of Sn-(0.1 to 2) wt % Cu, Sn-(0.5 to 5) wt % Ag, or Sn-(0.1 to 2) wt % Cu-(0.5 to 5) wt % Ag. According to this invention, a novel lead-free solder alloy, which functions as a replacement for a conventional lead-free solder, is provided, thus exhibiting superior spreadability, wettability, and mechanical properties than a conventional lead-free solder.

2 Claims, 13 Drawing Sheets

(51) Int. Cl.
*B23K 35/36* (2006.01)
*C22C 13/00* (2006.01)

(56) References Cited

FOREIGN PATENT DOCUMENTS

| EP | 1889683 | | 2/2008 |
|---|---|---|---|
| EP | 2752270 | | 7/2014 |
| JP | H10-180483 A | | 7/1998 |
| JP | 2005-319470 A | | 11/2005 |
| JP | 2005319470 A | * | 11/2005 |
| JP | 2008-036691 | | 2/2008 |
| JP | 2008-036691 A | | 2/2008 |
| JP | 2009191353 A | | 8/2009 |
| JP | 2011-025287 A | | 2/2011 |
| KR | 10-2011-0026666 A | | 3/2011 |
| WO | WO 2013/017885 | | 2/2013 |

OTHER PUBLICATIONS

European Search Report for European Patent Application No. EP 15833088.6, dated Dec. 22, 2017, 6 Pages.
PCT International Search Report, PCT/KR2015/008611, dated Nov. 23, 2015, 4 Pages.
Ki, et al., "Nano-Composite Solder Technology for the Improvement of Solder Joint Properties," Journal of the Microelectronics & Packaging Society, 2011, vol. 18, No. 3, pp. 9-17 (with English abstract).
Office Action for Chinese Patent Application No. CN 201580044355.3, dated Jun. 1, 2018, 15 Pages.

* cited by examiner

LEAD-FREE SOLDER ALLOY COMPOSITION AND METHOD FOR PREPARING LEAD-FREE SOLDER ALLOY

TECHNICAL FIELD

The present invention relates to a lead-free solder alloy composition and a method of preparing a lead-free solder alloy, and more particularly to a lead-free solder alloy composition and a method of preparing a lead-free solder alloy, wherein the lead-free solder alloy composition is non-toxic and is able to solve environmental problems resulting from the toxicity of lead (Pb), thereby minimizing the effect of harmful metal elements such as lead and the like on the environment.

BACKGROUND ART

Typically, Sn—Pb-based lead solder has been used as the most effective binding material for electronic devices for a long time. However, when an electronic device using a solder is discarded, lead (Pb) contained in the solder is eluted by acid rain thereby polluting groundwater. Furthermore, such component has been identified as an environmental pollutant because it harms the human body, for example, deteriorating intelligence and reproductive function, when absorbed by the human body. Such lead solder is particularly utilized as a binder for mounting small electronic parts such as semiconductor chips or resistor chips on a printed circuit board.

In particular, the use of lead (Pb)-containing products is strictly limited, and Sn—Pb solder is being replaced with lead-free solder. A variety of restrictions for prohibiting the use of Pb in micro-electronic devices have been imposed. Thus, Sn—Pb solder has to be replaced with Pb-free Sn—Ag solder to develop an environmentally friendly lead-free solder. For this reason, in recent times, when solder alloy is manufactured, the use of lead is restricted or excluded, whereby many attempts have been made to develop an environmentally friendly lead-free solder composition.

Technology relevant to the lead-free solder is proposed in Korean Patent Nos. 0209241 and 0814977.

As disclosed in Korean Patent Nos. 0209241 and 0814977, a lead-free solder composition, and a high-temperature system lead-free solder composition and an electronic device and a printed circuit board using the same, are briefly described below.

The lead-free solder composition comprising tin (Sn), silver (Ag), bismuth (bi) and indium (In), which is disclosed in Korean Patent No. 0209241 (Prior Art 1), is composed of 82 wt % to 93 wt % of tin (Sn), 2 wt % of silver (Ag), 3 wt % to 10 wt % of bismuth (Bi), and 2 wt % to 6 wt % of indium (In).

However, indium (In) needed to form the lead-free solder composition of Prior Art 1 is expensive, and a solder containing bismuth (Bi) may become brittle due to deteriorating ductility with increasing amount of bismuth (Bi).

FIG. 1 is a mimetic diagram schematically showing the principle of inhibiting the generated amount of an oxide of a lead-free solder composition in Korean Patent No. 0814977 (Prior Art 2). As shown in FIG. 1, the high-temperature system lead-free solder composition of Prior Art 2 comprises 2 wt % to 5 wt % of copper, 0.001 wt % to 1.0 wt % of nickel, 0.001 wt % to less than 0.05 wt % of silicon, 0.001 wt % to 0.2 wt % of phosphorus, 0.001 wt % to less than 0.01 wt % of cobalt, and the remainder of tin.

However, the high-temperature system lead-free solder composition of Prior Art 2 also needs indium which is expensive and thus, there is a problem in that the use of indium is limited.

Although not shown in the drawing, recently attention has been focused on the development of solders comprising Sn, Ag, Bi, Cu, In, and Zn, particularly a composition composed of Sn, Ag and Cu. However, the aforementioned respective lead-free solders have various problems. For example, Zn is sensitive to oxidation and resulting decrease in solderability. Solder including Bi is decreased in ductility with an increase in Bi content, thus causing brittleness. Sn—Cu solder is inexpensive, but has very poor wettability. Solder containing In is expensive. Solder containing Ag readily forms a coarse needle-shaped intermetallic compound $Ag_3Sn$, thus decreasing solderability and joint strength. Consequently, not only solder including lead-free solder, but also the aforementioned disadvantages (especially wettability) have to be minimized.

Moreover, Sn-0.7Cu, Sn-3.5Ag, and SAC305 solder (96.5 wt % Sn-3.0 wt % Ag-0.5 wt % Cu) microstructures include a dendritic phase and a eutectic phase composed of Sn, $Ag_3Sn$, and $Cu_6Sn_5$. However, the shape and structure of $Ag_3Sn$ and $Cu_6Sn_5$ are regarded as important in terms of reliability of the solder. If the amount of Ag is greater than 2 wt % in the matrix, a coarse plate of $Ag_3Sn$ may be formed, undesirably worsening soldering properties. On the other hand, if the amount of Ag in the Sn—Ag alloy is less than 2 wt %, a liquid temperature may be increased, a coexistence region of a liquid phase and a solid phase is enlarged, and the strength of the joint may decrease. Hence, the growth of intermetallic compounds has to be inhibited using a ceramic nanopowder-reinforcing agent as an additive.

DISCLOSURE

Technical Problem

Accordingly, the present invention has been made to overcome the problems encountered in the art, and the present invention is intended to provide a lead-free solder alloy composition and a method of preparing a lead-free solder alloy, wherein the solder alloy of Sn—Cu, Sn—Ag, or Sn—Ag—Cu based on Sn—Cu and an additive, Sn—Ag and an additive, or Sn—Ag—Cu and an additive is used, and may thus exhibit superior wettability and spreadability for a substrate and electronic parts for use in micro-electronic packaging, and is particularly harmless to human environment.

In addition, the present invention is also intended to provide a lead-free solder alloy composition and a method of preparing a lead-free solder alloy, wherein in the process of adding a ceramic nanopowder as an additive to an alloy of Sn—Cu, Sn—Ag, or Sn—Ag—Cu, the use of the nanopowder additive is able to decrease the size of solder particles and also minimize the size and thickness of lethal needle-shaped $Ag_3Sn$, thus increasing bonding strength and wettability.

In addition, the present invention is also intended to provide a lead-free solder alloy composition and a method of preparing a lead-free solder alloy, wherein a solder microstructure having high solder bonding reliability and wettability may be obtained, and the microstructure of an intermetallic compound such as $Ag_3Sn$ becomes finer and the thickness thereof is decreased by the use of a nanopowder additive, and also, the particle size of the solder is decreased with the addition of the nanopowder additive, thus improving creep and fatigue properties of the solder joint.

In addition, the present invention is also intended to provide a lead-free solder alloy composition and a method of preparing a lead-free solder alloy, wherein the wettability decrease is prevented by the solder components, whereby poor contact between materials to be joined may be suppressed at joints, thus exhibiting superior mechanical properties and wettability and also attaining a micronized and uniform microstructure.

Technical Solution

To achieve the above objective the present invention provides a lead-free solder alloy composition, wherein a ceramic powder is added to a lead-free solder of Sn-(0.1 to 2) wt % Cu, Sn-(0.5 to 5) wt % Ag, or Sn-(0.1 to 2) wt % Cu-(0.5 to 5) wt % Ag.

Also in the present invention, an additive added to the ceramic powder may include at least one selected from among $La_2O_3$, SiC, Cu-coated CNT (Cu-CNT), and $ZrO_2$.

Also in the present invention, contents of the ceramic powder are 0.01 wt % to 1.0 wt % of $La_2O_3$ of, 0.01 wt % to 1.0 wt % of SiC, and 0.005 wt % to 1.0 wt % of Cu-CNT.

Also in the present invention, the ceramic powder may have a size of 10 μm or less.

In addition, the present invention provides a method of preparing a lead-free solder alloy, comprising: a step of mixing at least one solder powder selected from among Sn—Cu, Sn—Ag, and Sn—Cu—Ag; a step of melting the mixed solder powder; and a step of adding an additive to the melted solder powder.

Also in the present invention, in the step of adding the additive, the additive may be at least one ceramic powder selected from among $La_2O_3$, SiC, Cu-coated CNT (Cu-CNT), and $ZrO_2$.

Also in the present invention, in the step of adding the additive, the contents of the ceramic powder are 0.01 wt % to 1.0 wt % of $La_2O_3$, 0.01 wt % to 1.0 wt % of SiC, and 0.005 wt % to 1.0 wt % of Cu-CNT.

Advantageous Effects

According to the present invention, a novel lead-free solder alloy, which is available as a replacement for a conventional lead-free solder, is provided, thus exhibiting superior spreadability, wettability, and mechanical properties.

Also, according to the present invention, the solders base three different types of alloy systems using Sn—Cu, Sn—Ag, or Sn—Ag—Cu as metal bases, and nanometer-sized ceramic particles added thereto function to uniformly micronize the matrix structure of the solder alloy and the $Ag_3Sn$ metal compound and to improve spreadability. That is, since the large $Ag_3Sn$ metal compound causes cracking and generates voids to thus damage a solder joint and decrease the reliability of the solder joint, the solder of the present invention including a fine $Ag_3Sn$ compound is able to increase the reliability and lifetime of the solder joint.

Also, the present invention, through the manufactured solder alloy, can exhibit higher hardness and thus high impact resistance compared to a conventional Sn—Ag—Cu alloy containing no nanopowder.

Also, according to the present invention, flow and wetting properties can be improved, thus suppressing defects in solder joints.

BEST MODE

The above-identified objective is achieved by the present invention, through a lead-free solder alloy composition wherein a ceramic powder is added to a lead-free solder of Sn-(0.1 to 2) wt % Cu, Sn-(0.5 to 5) wt % Ag, or Sn-(0.1 to 2) wt % Cu-(0.5 to 5) wt % Ag.

Also, in the present invention, the additive added to the ceramic powder may include at least one selected from among $La_2O_3$, SiC, Cu-coated CNT (Cu-CNT) and $ZrO_2$.

Also, the contents of the ceramic powder of the present invention are 0.01 wt % to 1.0 wt % of $La_2O_3$, 0.01 wt % to 1.0 wt % of SiC, and 0.005 wt % to 1.0 wt % of Cu-CNT.

Also, in the present invention, the ceramic powder has a size of 10 μm or less.

Also, the present invention addresses a method of preparing a lead-free solder alloy, comprising: a step of mixing at least one solder powder selected from among Sn—Cu, Sn—Ag and Sn—Cu—Ag base, a step of melting the mixed solder powder, and a step of adding an additive to the melted solder powder.

Also, in the step of adding the additive, the additive may be at least one ceramic powder selected from among $La_2O_3$, SiC, Cu coated CNT (Cu-CNT), and $ZrO_2$.

Also, in the step of adding the additive, the contents of ceramic powder are 0.01 wt % to 1.0 wt % of $La_2O_3$, 0.01 wt % to 1.0 wt % of SiC, and 0.005 wt % to 1.0 wt % of Cu-CNT.

Mode for Invention

The terminologies or words used in the description and the claims of the present invention should be construed based on the meanings and concepts consistent with the technical idea of the invention based on the principle that the inventors can appropriately define the terms in order to describe the invention in the best way.

In the overall specification, when any part "includes" any element, this means that another element is not excluded, but may be further included unless otherwise specifically mentioned.

Hereinafter, a detailed description will be given of a lead-free solder alloy composition and a method of preparing a lead-free solder alloy according to embodiments of the present invention, with reference to the accompanying drawings.

Figure 1:
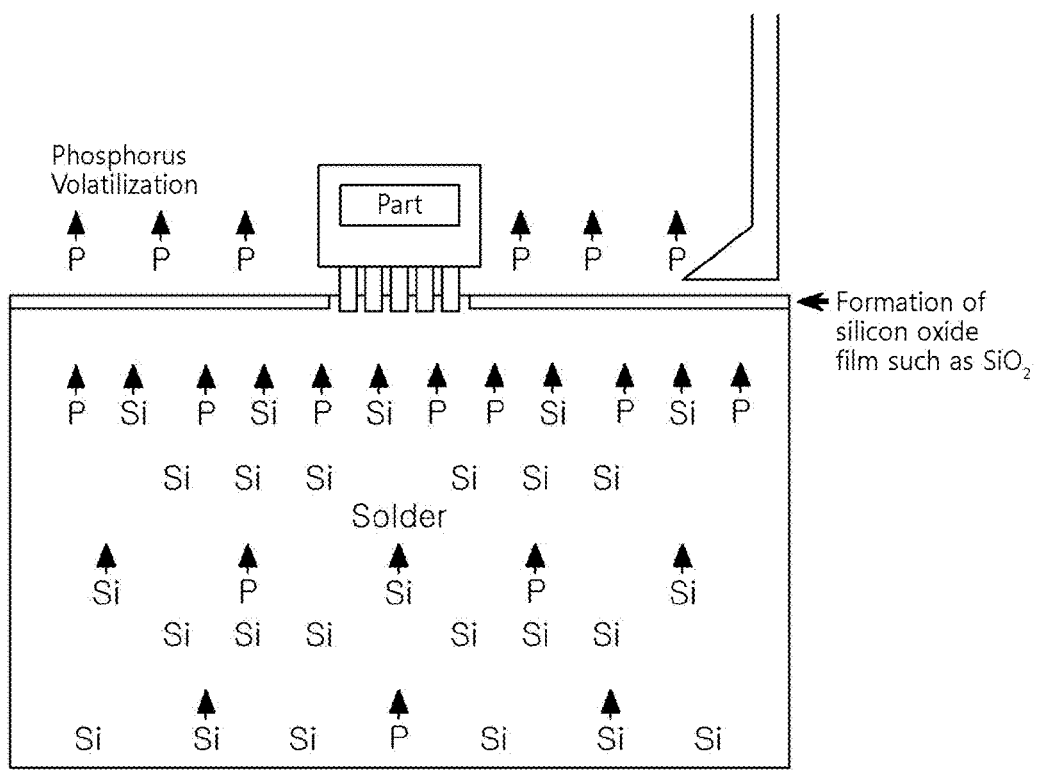
FIG. 1 is a mimetic diagram schematically showing the principle of inhibiting an amount of oxide generated in a lead-free solder composition according to Prior Art 2.
Figure 2A:
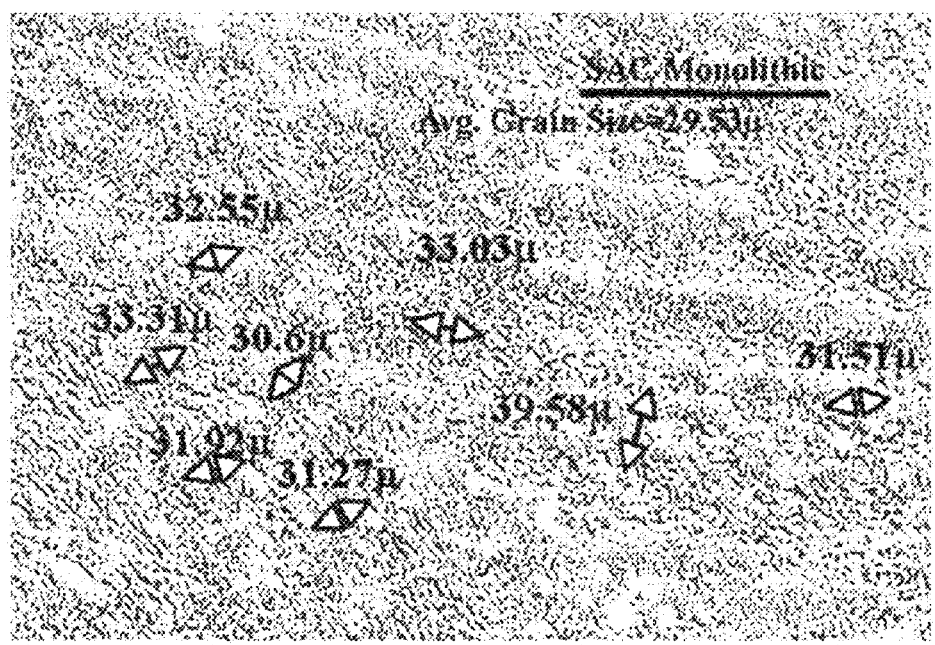
FIGS. 2A through 2D show images illustrating the average thickness of the intermetallic compound of solders containing nanopowder and a solder containing no nanopowder when a lead-free solder alloy composition according to the present invention is used.
Figure 2B:
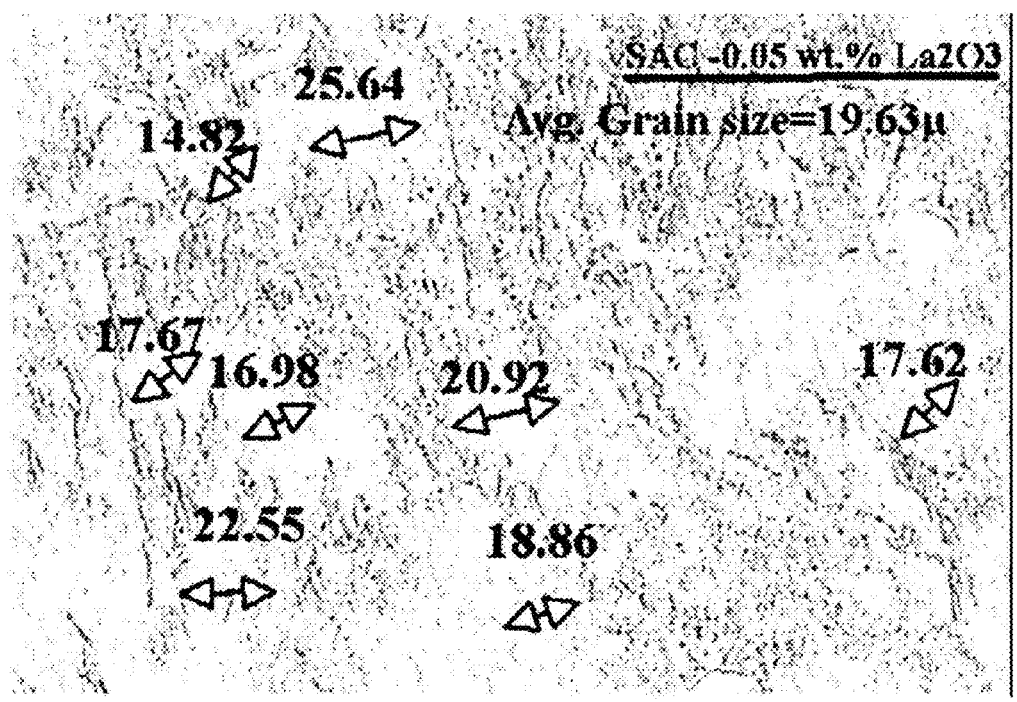
Figure 2C:
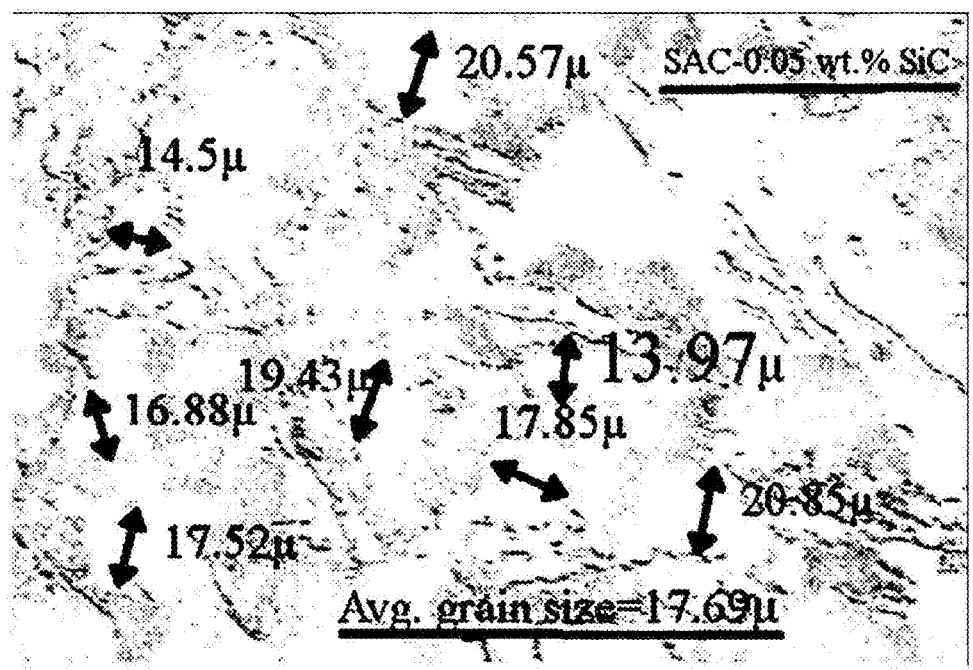
Figure 2D:
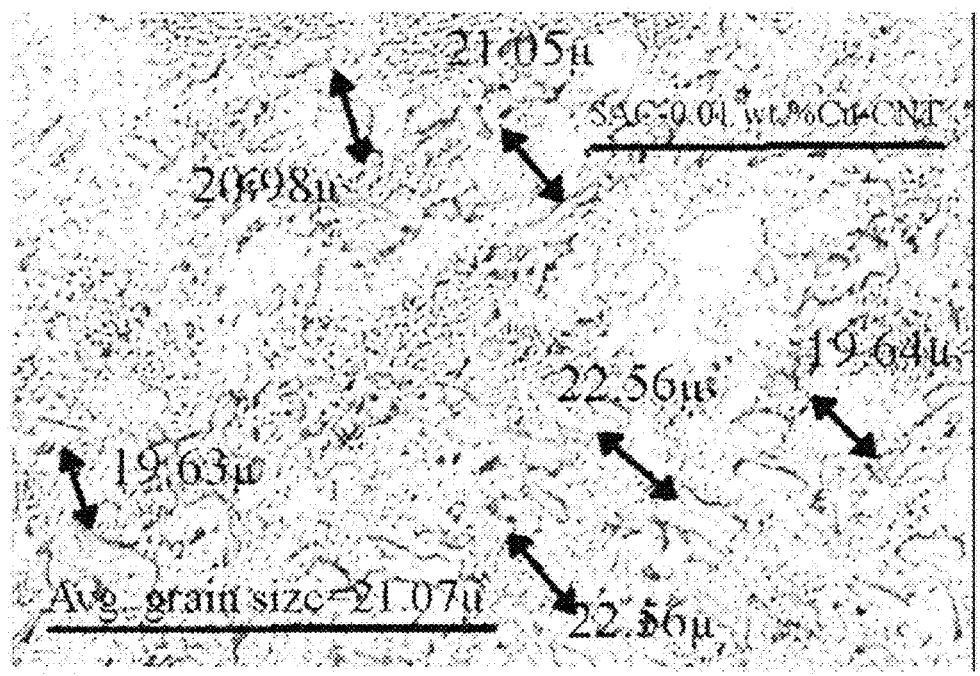
Figure 3A:
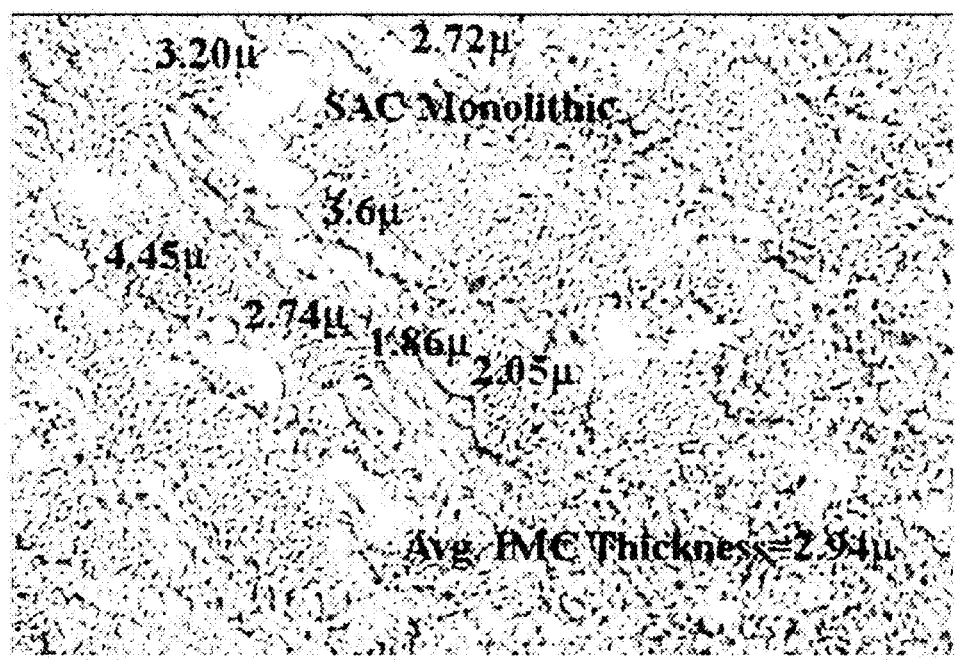
FIGS. 3A through 3D show images illustrating the average grain size of the solders containing nanopowder and the solder containing no nanopowder when the lead-free solder alloy composition according to the present invention is used.
Figure 3B:
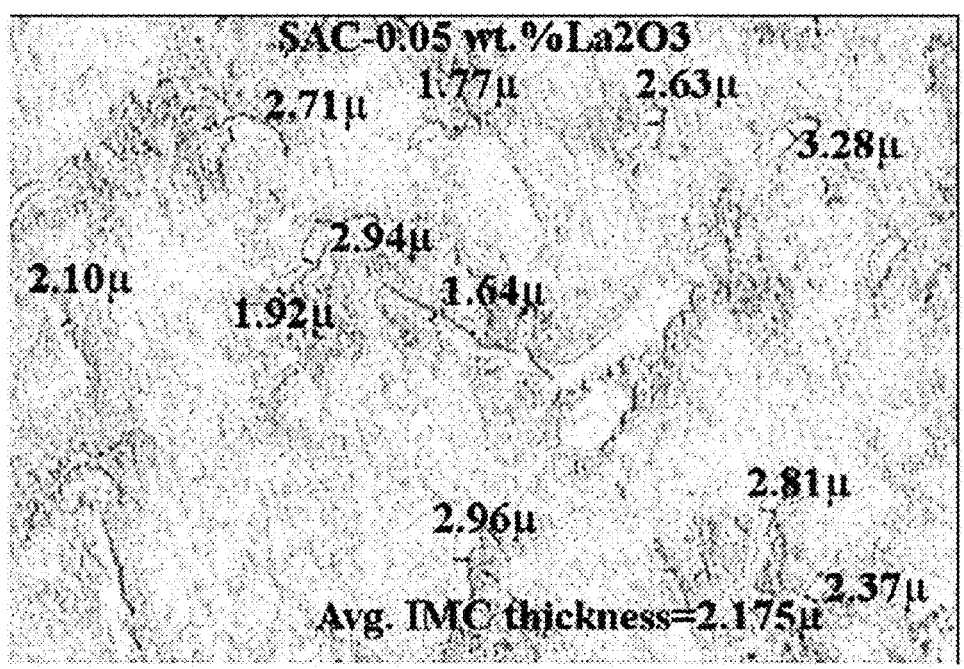
Figure 3C:
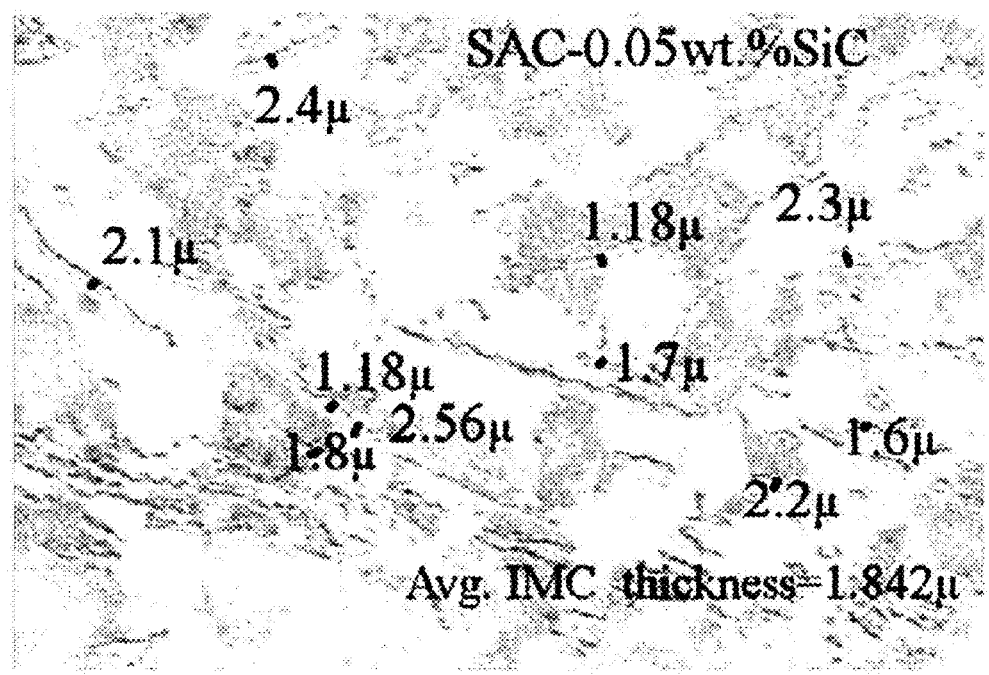
Figure 3D:
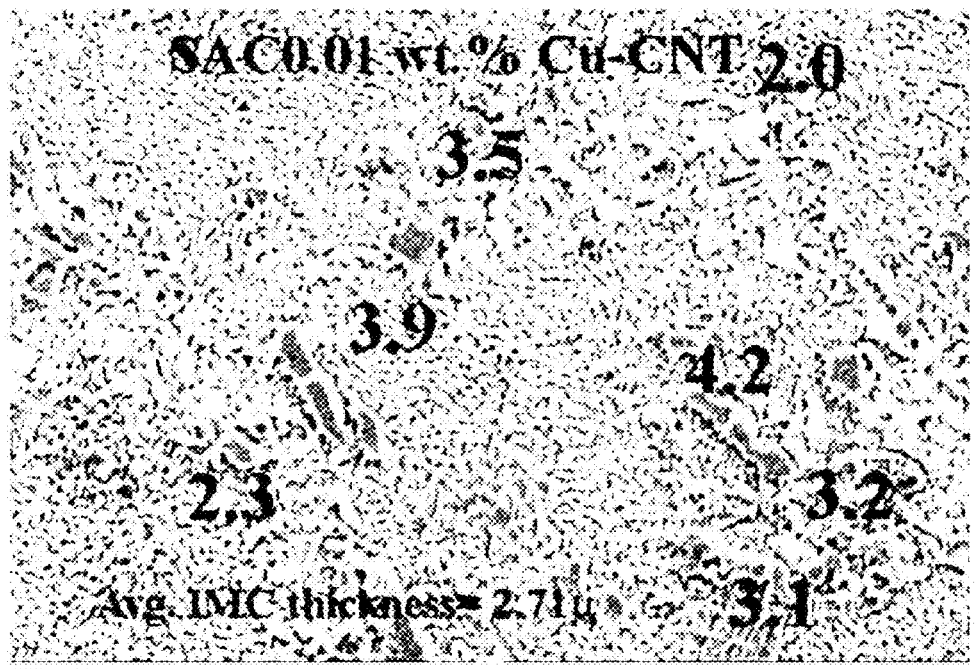
Figure 4:
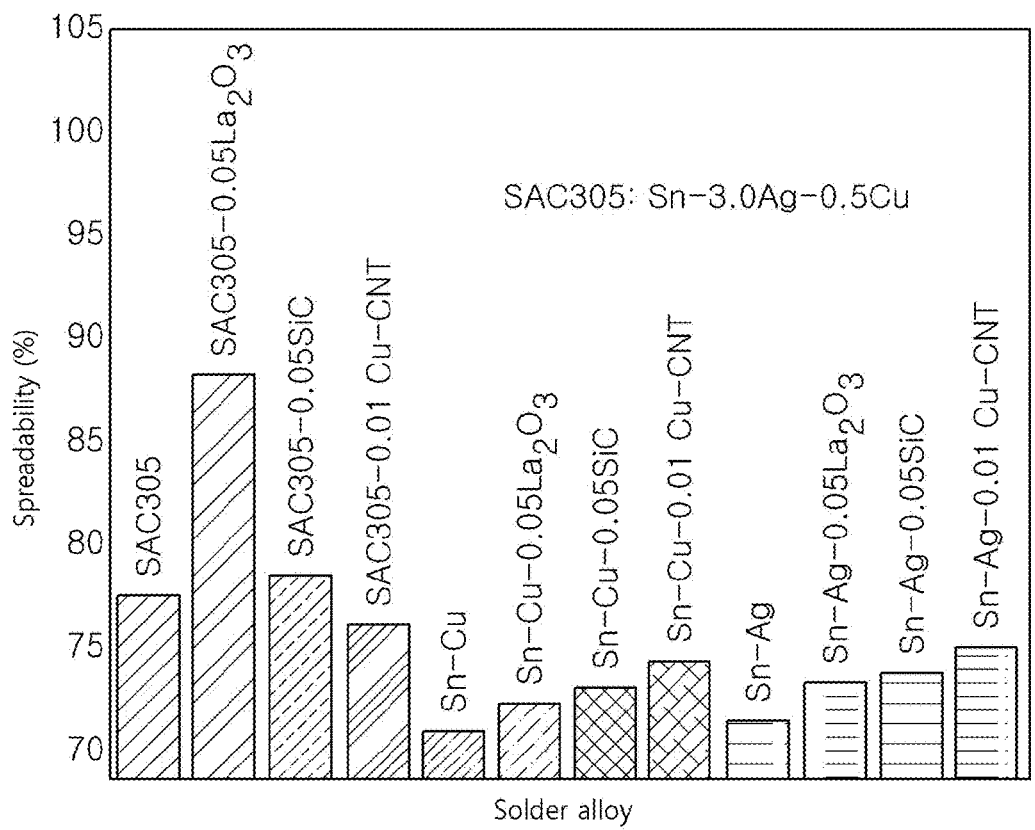
FIG. 4 is a graph comparing the spreadability of Sn—Cu, Sn—Ag and Sn—Cu—Ag lead-free solders and Sn—Cu, Sn—Ag and Sn—Cu—Ag lead-free solders containing additives, when the lead-free solder alloy composition according to the present invention is used.
Figure 5:
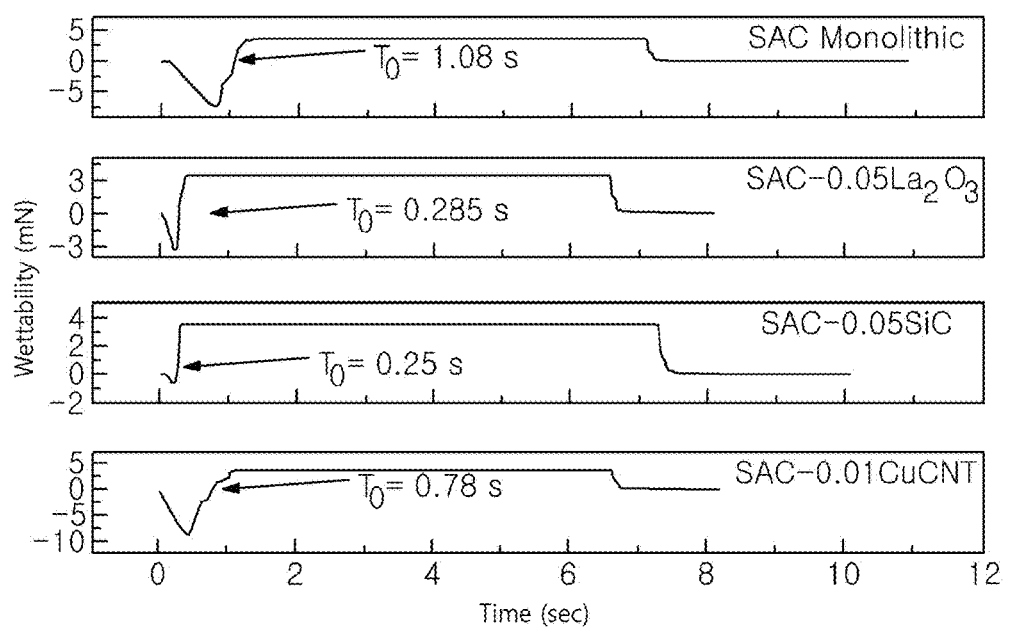
FIG. 5 is a graph showing the results of the measured wettability of the Sn—Cu—Ag lead-free solder and the Sn—Cu—Ag lead-free solder containing an additive, when the lead-free solder alloy composition according to the present invention is used.
Figure 6:
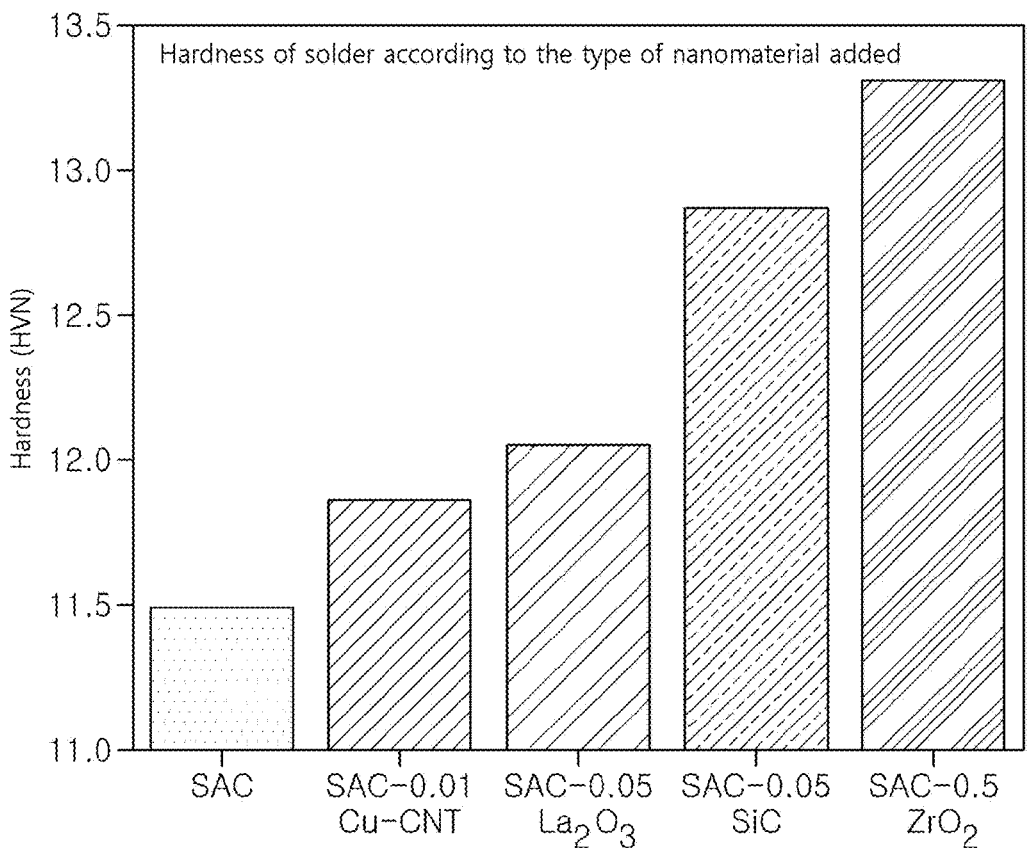
FIG. 6 is a graph showing the results of the measured hardness of the Sn—Cu—Ag lead-free solder and the Sn—Cu—Ag lead-free solder containing an additive, when the lead-free solder alloy composition according to the present invention is used.

FIG. 2 shows images illustrating the average thickness of the intermetallic compound of solders containing nanopowder and a solder containing no nanopowder in a lead-free solder alloy composition according to the present invention, FIG. 3 shows images illustrating the average grain size of the solders containing nanopowder and the solder containing no nanopowder in the lead-free solder alloy composition according to the present invention, FIG. 4 is a graph showing the results of a comparison of the spreadability of Sn—Cu, Sn—Ag and Sn—Cu—Ag lead-free solders and Sn—Cu, Sn—Ag and Sn—Cu—Ag lead-free solders containing additives, in the lead-free solder alloy composition according to the present invention, FIG. 5 is a graph showing the results of measurement of wettability of the Sn—Cu—Ag lead-free solder and the Sn—Cu—Ag lead-free solders containing additives, in the lead-free solder alloy composition according to the present invention, and FIG. 6 is a graph showing the results of measurement of hardness of the Sn—Cu—Ag lead-free solder and the Sn—Cu—Ag lead-free solders containing additives, in the lead-free solder alloy composition according to the present invention.

According to the above drawings, the lead-free solder alloy composition of the present invention comprises adding a ceramic powder to a lead-free solder of Sn-(0.1 to 2) wt % Cu, Sn-(0.5 to 5) wt % Ag, or Sn-(0.1 to 2) wt % Cu-(0.5 to 5) wt % Ag.

Here, the additive added to the ceramic powder may include at least one selected from among $La_2O_3$, SiC, and Cu coated CNT (Cu-CNT), and the amount of $La_2O_3$ is 0.01 wt % to 1.0 wt %, the amount of SiC is 0.01 wt % to 1.0 wt %, and the amount of Cu-CNT is 0.005 wt % to 1.0 wt %. The ceramic powder preferably has a size of 10 m or less.

That is, the developed solder alloy is improved in wettability and spreadability, and is composed of Sn—Cu and an additive, Sn—Ag and an additive, or Sn—Ag—Cu and an additive. The selected additives are a nanometer-sized ceramic powder such as $La_2O_3$, SiC, and Cu-CNT (CNT: Carbon Nanotube). A solder joint including a solder alloy of Sn—Ag—Cu, Sn—Ag, or Sn—Cu base which is a typical lead-free solder, a solder ball or a solder paste, and the process produces a solder joint including a reinforced intermetallic compound such as $Ag_3Sn$, $Cu_6Sn_5$ or the like.

Here, in the lead-free solder alloy composition, the Sn—Cu solder alloy is configured such that the amount of Cu is 0.1 wt % to 2 wt % (preferably 0.7 wt %). The Sn—Ag alloy includes Ag in an amount of 0.5 wt % to 5 wt % (preferably 3.5 wt %). Also, the Sn—Ag—Cu alloy includes Ag in an amount of 0.5 wt % to 5 wt % (preferably 3 wt %) and Cu in an amount of 0.1 wt % to 2 wt % (preferably 0.5 wt %). Additives added to the solder are $La_2O_3$, SiC, and Cu-coated CNT (Carbon Nanotube). The composition of each additive is 0.01 wt % to 1.0 wt % (preferably 0.05 wt %) of $La_2O3$, 0.01 wt % to 1.0 wt % (preferably 0.05 wt %) of SiC, and 0.005 wt % to 1.0 wt % (preferably 0.01 wt %) of Cu-CNT.

The lead-free solder alloy is composed of about 96.5 wt % of Sn, 3.0 wt % of Ag, 0.5 wt % of Cu, and a nanometer-sized powder reinforcing agent as an additive. The reinforcing agent includes 0.01 wt % to 1.0 wt % (preferably 0.05 wt %) of $La_2O3$, 0.01 wt % to 1.0 wt % (preferably 0.05 wt %) of SiC, and 0.005 wt % to 1.0 wt % (preferably 0.01 wt %) of Cu-CNT. Compared to the Sn-3.0Ag-0.5Cu (SAC305) solder alloy containing no additive, it is preferred that the zero cross time is short in order to improve wettability. However, the zero cross time of the Sn-3.0% Ag-0.5% Cu alloy was 1.08 sec., about 73.6% (0.285 sec) when $La_2O_3$ was added to the Sn-3.0% Ag-0.5% Cu alloy, 76.8% (0.25 sec) upon the addition of SiC, and 27.7% (0.78 sec) upon the addition of Cu-CNT.

Further, the lead-free solder alloy is composed of about 96.5 wt % of Sn, 3.0 wt % of Ag, 0.5 wt % of Cu, and a nanopowder reinforcing agent as an additive, such as $La_2O_3$, SiC, and Cu-CNT. A solder using only Sn-3.0 wt % Ag-0.5 wt % Cu was observed to have an average grain size of about 30 μm. When the solder containing the additive is compared with the Sn-3.0 wt % Ag-0.5 wt % Cu solder, the average grain size was decreased by 33.5% to 20 μm when $La_2O_3$ was added, decreased by 40% to 17.69 μm when SiC was added, and decreased by 28.64% to 21.07 μm when Cu-CNT was added. That is, the grain size of the solder becomes micronized according to the addition of the additive. Typically, when the grain size of a metal is micronized, yield strength and tensile strength are increased according to the following Hall-Petch Equation.

$$\sigma_y = \sigma_0 + \frac{K}{\sqrt{d}}$$

$\sigma_y$: yield strength, d: average grain diameter, $\sigma_0$ and K: constant When the solder is manufactured using the composition of the present invention, it is known that the solder alloy is configured to include an intermetallic compound (IMC) having a fine thickness therein. The average thickness of the intermetallic compound is about 2.7 μm in the case of the Sn-3.0 wt % Ag-0.5 wt % Cu (SAC3055) solder alloy containing no additive. When the solder containing the additive is compared with the Sn-3.0 wt % Ag-0.5 wt % Cu solder, it is seen that the average thickness of the intermetallic compound decreased by 18% to 2.2 μm when $La_2O_3$ is added, decreased by 37% to 1.84 μm, when SiC is added, and decreased by 7.8% to 2.71 μm when Cu-CNT is added.

The Sn-3.0Ag-0.5Cu solder alloy containing the ceramic nanopowder exhibits considerably high spreadability compared to that of the Sn-3.0Ag-0.5Cu solder. The spreadability thus increased is highly favorable in solder bonding of electronic circuits and electric systems. The solder having superior spreadability may be easily spread on a sensitive electronic part or circuit board upon soldering, whereby a solder joint may be efficiently formed, thus decreasing the incidence of defects and increasing strength in the solder joints.

When the solder, to which the nano-sized $La_2O_3$, SiC, and Cu-CNT are added, is melted and then solidified in the soldering process, $La_2O_3$, SiC, and Cu-CNT, having a melting point much higher than that of Sn(231), are present in the form of a fine nano-sized solid, and function as a solid nucleation site (seed) upon solidification of the powder added thereto. Thereby, the added nanopowder provides many nucleation sites on which solid crystals are produced, and thus the grain size is micronized compared to the Sn-3.0Ag-0.5Cu solder containing no additive. In addition, the nano-sized $La_2O_3$, SiC, and Cu-CNT hinder the formation of the intermetallic compound (IMC), such as $Ag_3Sn$, $Cu_6Sn_5$ or the like, in the solder, whereby the intermetallic compound is micronized, thus exhibiting higher strength and superior properties of the solder.

In the present invention, the composition of the reinforcing agent is diverse, including 0.01 wt % to 1.0 wt % $La_2O_3$ (preferably 0.05 wt %), 0.01 wt % to 1.0 wt % of SiC (preferably 0.05 wt %), and 0.005 wt % to 1.0 wt % of Cu-CNT (preferably 0.01 wt %). If the amounts of $La_2O_3$ and SiC are less than 0.01 wt %, soldering properties are not improved. On the other hand, if the amounts thereof exceed 1.0 wt %, soldering properties may deteriorate and dewetting, which is a wetting defect, may occur.

Likewise, when Cu-CNT is added in an amount of 0.005 wt % or less, wettability is not changed, and if the amount of Cu-CNT exceeds 1.0 wt %, dewetting may occur.

The composition and conditions of the solder of the present invention are given in Table 1 below.

TABLE 1

| Component | Amount |
| --- | --- |
| Sn—Cu | 0.1~1.0 wt % Cu, remainder of Sn |
| Sn—Ag | 0.5~4.0 wt % Ag, remainder of Sn |
| Sn—Ag—Cu | 0.5~4.0 wt % Ag, 0.1~1.0 wt % Cu, remainder of Sn |
| $La_2O_3$ | 0.01~1.0 wt % |
| SiC | 0.01~1.0 wt % |
| Cu-CNT | 0.005~1.0 wt % |
| $ZrO_2$ | 0.01~1.0 wt % |
| $La_2O_3$, SiC | 0.01~0.5 wt % $La_2O_3$, 0.01~0.5 wt % SiC |
| SiC, Cu-CNT | 0.01~0.5 wt % SiC, 0.005~0.5 wt % Cu-CNT |
| $La_2O_3$, Cu-CNT | 0.01~0.5 wt % $La_2O_3$, 0.005~0.5 wt % Cu-CNT |
| $La_2O_3$, SiC, Cu-CNT | 0.01~0.5 wt % $La_2O_3$, 0.01~0.5 wt % SiC, 0.005~0.5 wt % Cu-CNT |
| $La_2O_3$, $ZrO_2$ | 0.001~1.0 wt % $La_2O_3$, 0.01~1.0 wt % $ZrO_2$ |
| SiC, $ZrO_2$ | 0.01~1.0 wt % SiC, 0.01~1.0 wt % $ZrO_2$ |
| Cu-CNT, $ZrO_2$ | 0.005~1.0 wt % Cu-CNT, 0.01~1.0 wt % $ZrO_2$ |
| $La_2O_3$, SiC, Cu-CNT, and $ZrO_2$ | 0.001~ 0.1 wt % $La_2O_3$, 0.01~1.0 wt % SiC, 0.005~1.0 wt % Cu-CNT, and 0.01~1.0 wt % $ZrO_2$ |
| Sn | Remainder |
| SAC305 Particle size | 20 to 38 μm |
| $La_2O_3$ Particle size | 30 nm |
| SiC Particle size | 70 nm |
| Cu-CNT diameter | 20 nm |
| $ZiO_2$ | 10 nm |

As is apparent from Table 1, two kinds of ceramic nanopowder are mixed and added as follows.

(1) When $La_2O_3$ and SiC are mixed and added, the amount of $La_2O_3$ is 0.01 wt % to 0.5 wt % (preferably 0.02 wt %), and the amount of SiC is 0.01 wt % to 0.5 wt % (preferably 0.03 wt %).

(2) When SiC and Cu-CNT are mixed and added, the amount of SiC is 0.01 wt % to 0.5 wt % (preferably 0.04 wt %), and the amount of Cu-CNT is 0.005 wt % to 0.5 wt % (preferably 0.01 wt % Cu-CNT).

(3) When $La_2O_3$ and Cu-CNT are mixed and added, the amount of $La_2O_3$ is 0.01 wt % to 0.5 wt % (preferably 0.04 wt % $La_2O_3$), and the amount of Cu-CNT is 0.005 wt % to 0.5 wt % (preferably 0.01 wt %).

(4) When $La_2O_3$ and $ZrO_2$ are mixed and added, the amount of $La_2O_3$ is 0.01 wt % to 0.1 wt % (preferably 0.005 wt %), and the amount of $ZrO_2$ is 0.01 wt % to 1.0 wt % (preferably 0.5 wt %).

(5) When SiC and $ZrO_2$ are mixed and added, the amount of SiC is 0.01 wt % to 1.0 wt % (preferably 0.05 wt %), and the amount of $ZrO_2$ is 0.01 wt % to 1.0 wt % (preferably 0.5 wt % $ZrO_2$).

(6) When Cu-CNT and $ZrO_2$ are mixed and added, the amount of Cu-CNT is 0.005 wt % to 1.0 wt % (preferably 0.01 wt %), and the amount of $ZrO_2$ is 0.01 wt % to 1.0 wt % (preferably 0.5 wt % $ZrO_2$).

Next, the amount of three kinds of ceramic nanopowder mixed and added are as follows.

When $La_2O_3$, SiC and Cu-CNT are mixed and added, the amount of $La_2O_3$ is 0.01 wt % to 0.5 wt % (preferably 0.02 wt %), the amount of SiC is 0.01 wt % to 0.5 wt % (preferably 0.02 wt %), and the amount of Cu-CNT is 0.005 wt % to 0.5 wt % (preferably 0.01 wt %).

Also, the amount of four kinds of ceramic nanopowder mixed and added are as follows.

When four additives $La_2O_3$, SiC, Cu-CNT and $ZrO_2$ are mixed, the amount of $La_2O_3$ is 0.001 wt % to 0.1 wt % (preferably 0.005 wt %), the amount of SiC is 0.01 wt % to 1.0 wt % (preferably 0.05 wt %), the amount of Cu-CNT is 0.005 wt % to 1.0 wt % (preferably 0.01 wt %), and the amount of $ZrO_2$ is 0.01 wt % to 1.0 wt % (preferably 0.4 wt % $ZrO_2$).

As the main component of the present invention, there are Sn-containing lead-free solders Sn—Cu, Sn—Ag, and Sn—Ag—Cu alloys, Sn—Cu and an additive, Sn—Ag and an additive, and Sn—Ag—Cu and an additive. The addition of an additive increases wettability and spreadability of the solder.

In the lead-free solder alloy composition of the present invention, the Sn—Cu alloy includes 0.1 wt % to 2 wt % of Cu (preferably 0.7 wt %), the Sn—Ag alloy includes 0.5 wt % to 5 wt % of Ag (preferably 3.5 wt %), and the Sn—Ag—Cu alloy includes basically 0.5 wt % to 5 wt % of Ag (preferably 3 wt %) and 0.1 wt % to 2 wt % of Cu (preferably 0.5 wt %).

This solder alloy includes, as the additive, ceramic nanoparticles or carbon nanotubes. The selected additive may include lanthanum oxide ($La_2O_3$), silicon carbide (SiC), and copper-coated carbon nanotube (Cu-CNT).

For a solder paste resulting from the alloy of the present invention, a powder alloy having a solder powder size of 20 μm to 38 μm (classified as Type 4 in the solder paste standard) is used. The nanoparticle additive includes $La_2O_3$, SiC, and Cu-CNT, each having an average diameter of about 30 nm, 70 nm, and 20 nm. The additive improves the properties of the microstructure of the solder and micronizes the size of intermetallic compounds (IMC) such as $Ag_3Sn$, $Cu_6Sn_5$, etc. in the solder, thereby increasing the mechanical strength and wettability of the solder.

In order to improve wettability necessary for optimal soldering of the solder, the composition of the solder containing the additive has to be an optimal composition.

As an example, the optimal compositions for each solder are as follows.

The solder material is composed of a basic material and an additive, and each added material must be included at a predetermined ratio. 0.01 wt % to 1.0 wt % (preferably 0.05 wt %) of $La_2O_3$ is included, 0.01 wt % to 1.0 wt % (preferably 0.05 wt %) of SiC is included, and 0.005 wt % to 1.0 wt % (preferably 0.01 wt %) of Cu-CNT is included.

If the ratio of $La_2O_3$ or SiC is less than 0.01 wt %, the IMC of the solder material is thicker than the IMC of the Sn-3.0 wt % Ag-0.5 wt % Cu alloy solder. On the other hand, if $La_2O_3$ or SiC exceeds 1.0 wt %, the solder may become brittle, thus generating cracks in the faying surface and deteriorating the soldering properties. Likewise, if the amount of Cu-CNT is less than 0.005 wt %, there are no changes in wettability, and if the amount of Cu-CNT exceeds 1.0 wt %, liquidness fluidity may decrease and soldering properties may be deteriorated.

Preparation and testing of properties of lead-free solder alloy of the present invention—in order to evaluate the microstructure and the IMC distribution, a scanning electron microscope (SEM) was used. Also to evaluate soldering properties, spreadability, wettability, and micro hardness testing were performed.

1. To manufacture solder alloys of the present invention, SnAgCu, SnAg, SnCu and additives were melted at 500° C. for 30 min.
2. Observation of microstructure: Grain size, IMC size
3. Measurement of hardness
4. Wetting balance test: Zero cross time, at 250
5. Spreading test: JIS-Z-3197

The preparation conditions for melting are shown in Table 2.

TABLE 2

| Melting temperature of mixed solder powder | 500° C. |
|---|---|
| Duration at 500° C., heating rate | 30 min, 10° C./min |

<Test>

Spreading Test

Spreading test was performed according to JIS-Z-3197 Standard. First, a copper piece having a size of 30 mm×30 mm×0.3 mm was polished and then washed with alcohol. After drying, it was heated at 150° C. for 1 hr to form a uniform oxide film.

0.3 g of a solder powder was mixed with 0.03 g of a flux, and placed at the center of the copper piece. The piece was placed in a solder bath heated to 300° C. and melted. After a while, the solder powder, positioned at the center of the copper piece, began to melt. When the copper piece was maintained for 30 seconds in the solder bath melted at 300° C. so that the solder powder completely melts and spread, the copper piece was taken out of the solder bath and cooled at room temperature. The spreading test was conducted using the solder spread on the cooled copper plate.

Wetting Balance Test

To measure the wettability of the alloy of the present invention, a wetting balance tester (RESCA SAT 5000) was used, and for a test sample a 99.99% oxygen-free copper plate having a size of 10 mm×1 mm×30 mm was used. The copper test sample was mechanically polished to remove a surface oxide layer and external impurities using a silicon carbide sandpaper (particle size #1200 & #2400), and then ultrasonically cleaned. Before the wetting balance test, the copper sample was slightly coated with a BGA-type flux (SENJU, Sparkle Flux WF-6063M5) and further activated for 30 sec in a solder melt. The copper sample was immersed in a melted solder (the solder of the present invention) at 250 for 5 sec at a rate of 2.5 mm/s to a depth of 2 mm. In the wetting balance test, the average zero cross time of each sample was measured.

<Description of Developed Technique>

$La_2O_3$ having an average particle size of 30 nm, SiC having an average particle size of 70 nm, and Cu-CNT having an average particle size of 20 nm were added to Sn-0.7 wt % Cu, Sn-3.5 wt % Ag and Sn-3.0 wt % Ag-0.5 wt % Cu solders. The resulting mixtures were placed in an alumina crucible and melted at 500° C. for 1 hr in a furnace heated at a heating rate of 10/min. The solders were solidified, sampled, polished, and etched, and then the microstructures thereof were observed.

Measurement Results

Microstructure: when the microstructure of the Sn-3.0 wt % Ag-0.5 wt % Cu solder containing nanoparticles was compared with that of the Sn-3.0 wt % Ag-0.5 wt % Cu solder containing no nanoparticles, there was a clear difference in the grain size, precipitates, and matrix dispersion. The $Ag_3Sn$ intermetallic compound of the $La_2O_3$-added Sn-3.0 wt % Ag-0.5 wt % Cu became finer and dispersed well. On the other hand, the $Ag_3Sn$ intermetallic compound of the Sn-3.0 wt % Ag-0.5 wt % Cu solder containing no nanoparticles became coarse.

The micronization of the microstructure of commercially available Sn-3.0 wt % Ag-0.5 wt % Cu solder show improved physical properties thereof by the addition of ceramic nanoparticles. When Sn-3.0 wt % Ag-0.5 wt % Cu was added with ceramic nanoparticles, micro hardness was increased, but compared to the Sn-3.0 wt % Ag-0.5 wt % Cu solder containing no nanoparticles, when $La_2O_3$ was added hardness was increased by 5%, when SiC was added hardness was increased by 12.01%, and when Cu-CNT was added hardness was increased by 3.72%.

The grain size (FIG. 2) was identified through the microstructure measured using an electron microscope. The average grain size of the Sn-3.0 wt % Ag-0.5 wt % Cu solder containing no nanoparticles was about 30 μm. In contrast, the $La_2O_3$-added Sn-3.0 wt % Ag-0.5 wt % Cu solder had an average grain size of about 20 μm. The average grain size was 17.69 μm when SiC was added, and 21.07 μm μm when Cu-CNT was added.

The thickness of the intermetallic compound of the Sn-3.0 wt % Ag-0.5 wt % Cu solder containing nanopowder was also measured. The approximate measurement of the thickness of the intermetallic compound of the Sn-3.0 wt % Ag-0.5 wt % Cu solder alloys, with or without $La_2O_3$, SiC, and Cu-CNT, is illustrated in FIG. 3.

The intermetallic compound (IMC) in the Sn-3.0 wt % Ag-0.5 wt % Cu solder alloy was mostly $Ag_3Sn$. The average IMC thickness of the Sn-3.0 wt % Ag-0.5 wt % Cu solder containing no nanopowder was 2.97 μm, whereas the IMC thickness of the $La_2O_3$-added Sn-3.0 wt % Ag-0.5 wt % Cu solder was 2.37 μm. The average IMC thickness was 1.84 μm when SiC was added, and was 2.71 μm when Cu-CNT was added. By adding ceramic nanoparticles, the Sn-3.0 wt % Ag-0.5 wt Cu was decreased in IMC thickness and increased in strength. The alloy containing fine particles further hinders dislocation motion, thus improving the mechanical properties of the alloy.

Spreadability:

The spreadability of the solders manufactured in the present invention is shown in FIG. 4. About 0.03 g of a flux and about 0.3 g of a sample solder alloy were placed at the center of a piece of copper foil. The copper foil was placed in a molten solder bath maintained at 300° C. The sample solder immediately began to melt, and after 30 seconds, the copper foil was taken out of the solder bath and cooled at room temperature, and the spreading ratio was measured.

The spreading ratio was 77.77% in the Sn-3.0 wt % Ag-0.5 wt % Cu containing no nanopowder, was increased by 13% to 88.19% when $La_2O_3$ was added, increased by 1% to 78.7% when SiC was added, and was about 76.38% when Cu-CNT was added.

The spreading ratio was 71% in the Sn-0.7Cu alloy, 73% when $La_2O_3$ was added, and 74% when SiC was added. The spreading ratio was 75% when Cu-CNT was added to the Sn-0.7Cu alloy.

The spreading ratio was 72% in the Sn-3.5Ag alloy, 74% when $La_2O_3$ was added, 74% when SiC was added, and 75% when Cu-CNT was added.

Wettability:

When Sn-3.0 wt % Ag-0.5 wt % Cu was added with 0.01 to 1.0 wt % of $La_2O_3$ (preferably 0.05 wt % of $La_2O_3$), the zero cross time was much lower compared to that of the pure Sn-3.0 wt % Ag-0.5 wt % Cu solder, thus exhibiting the best wettability. The wetting properties of the two alloys are shown in FIG. 6.

Here, FIG. 6 is a graph showing the hardness measurement of Sn-3.0 wt % Ag-0.5 wt % Cu, and Sn-3.0 wt % Ag-0.5 wt % Cu containing $La_2O_3$, SiC, Cu-CNT, and $ZrO_2$.

The wetting test provides information about whether any solder may be wet through stronger bonding to a substrate or PCB in a given time. The important parameter in wettability is the zero cross time (T0). The zero cross time was 1.08 sec in the Sn-3.0 wt % Ag-0.5 wt % Cu containing no nanopowder, and was increased by 0.285 sec when $La_2O_3$ was added, by 0.25 sec when SiC was added, and by 0.78 sec when Cu-CNT was added.

Hardness:

The hardness was 11.49 VHN in the Sn-3.0 wt % Ag-0.5 wt % Cu containing no nanopowder, 12.05 VHN when $La_2O_3$ was added to the Sn-3.0 wt % Ag-0.5 wt % Cu, 12.01 VHN when SiC was added, 11.86 VHN when Cu-CNT was added, and 13.3 VHN when $ZrO_2$ was added, as shown in FIG. 6. The rigid and finely dispersed $Ag_3Sn$ phase is more effectively resistant to pressure and thus hardness is increased, compared to the widely formed $Ag_3Sn$ in the Sn-3.0 wt % Ag-0.5 wt % Cu containing no nanopowder.

The present invention is used as a soldering material. Specifically, it is used for a solder paste, a solder ball, a solder bar, a solder wire, etc., and in soldering electronic products using them. It is becoming smaller in order to satisfy the requirements of modern electronic devices such as high integration, low power or portability, size, and operating voltage. One critical issue is wettability, spreadability, and strength of the soldering part of the electronic devices. Hence, the demand for a solder having improved wettability and micronized $Ag_3Sn$ is increasing, and the solder of the present invention may be employed to solve such problems.

Figure 7:
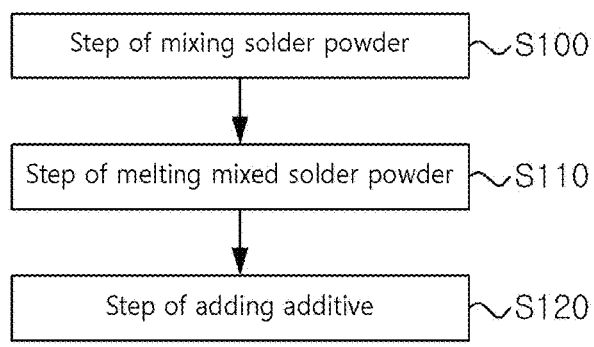
FIG. 7 is a block diagram showing the process of preparing a lead-free solder alloy according to the present invention.

FIG. 7 is a block diagram showing the process of preparing a lead-free solder alloy according to the present invention.

The method of preparing the lead-free solder alloy according to the present invention includes a step of mixing a solder powder (S100), a step of melting the mixed solder powder (S110) and a step of adding an additive (S120).

In the step of mixing the solder powder (S100), at least one solder powder selected from among Sn—Cu, Sn—Ag, and Sn—Cu—Ag base is mixed.

In the step of adding the additive (S120), the melted solder powder is added with an additive. The additive may be at least one ceramic powder selected from among $La_2O_3$, SiC, Cu-coated CNT (Cu-CNT), and $ZrO_2$. The contents of the ceramic powder are 0.01 wt % to 1.0 wt % of $La_2O3$, 0.01 wt % to 1.0 wt % of SiC, and 0.005 wt % to 1.0 wt % of Cu-CNT.

Figure 8:
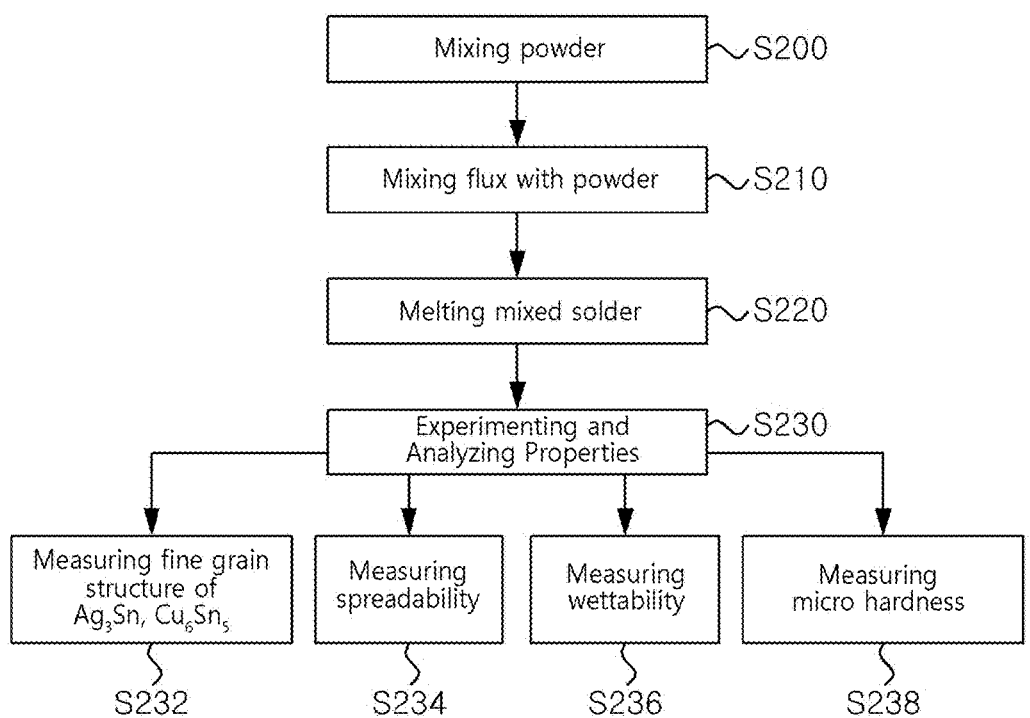
FIG. 8 is a block diagram showing the process of preparing a lead-free solder paste using the lead-free solder alloy composition according to the present invention.

FIG. 8 is a block diagram showing the process of preparing a lead-free solder paste using the lead-free solder alloy composition of the present invention.

The method of preparing a lead-free solder paste using the lead-free solder alloy composition of the present invention includes a step of mixing a powder (S200), a step of mixing a flux with the powder (S210), a step of melting the mixed solder (S220), and a step of analyzing experimental properties (S230).

The step of mixing the powder (S200) is a step of mixing powder in a ball mill, and is performed with SAC (Type 4, a size of 20 μm to 38 μm), $La_2O_3$ (30 nm) and mixing conditions (200 rpm, 1 hr).

The step of mixing the flux with the powder (S210) is a step of mixing the flux and the powder at an appropriate ratio, and the mixing ratio of the solder to the flux is 9:1.

The step of melting the mixed solder (S220) is a step of melting the mixed solder, which is maintained at 500° C. for 30 min and the heating rate is 5° C./min.

The step of analyzing the experimental properties (S230) includes measuring a fine grain structure of $Ag_3Sn$ or $Cu_6Sn_5$ (S232), measuring spreadability (S234), measuring wettability (S236), and measuring micro hardness (S238).

Although the embodiments of the present invention have been disclosed with reference to limited embodiments and the drawings, the present invention is not limited to those embodiments, and for those skilled in the art various modifications and alterations are possible from the above description.

Therefore, the scope of the present invention should not be confined to the disclosed embodiments, and should be defined by the accompanying claims and equivalents thereto.

INDUSTRIAL APPLICABILITY

The present invention pertains to a lead-free solder alloy composition and a method of preparing a lead-free solder alloy, wherein the lead-free solder alloy composition of the present invention comprises a ceramic powder added to a lead-free solder of Sn-(0.1 to 2) wt % Cu, Sn-(0.5 to 5) wt % Ag, or Sn-(0.1 to 2) wt % Cu-(0.5 to 5) wt % Ag.

According to the present invention, a novel lead-free solder alloy, as a replacement for a conventional lead-free solder, can be provided, thus exhibiting superior spreadability, wettability, and mechanical properties than conventional solders.

The invention claimed is:

1. A lead-free solder alloy composition, wherein at least one ceramic powder selected from among $La_2O_3$, SiC, and Cu-coated CNT (Cu-CNT) is added to a lead-free solder of Sn-(0.1 to 2) wt % Cu, Sn-(0.5 to 5) wt % Ag, or Sn-(0.1 to 2) wt % Cu-(0.5 to 5) wt % Ag, wherein contents of the ceramic powder are 0.01 wt % to 1.0 wt % of $La_2O_3$, 0.01 wt % to 1.0 wt % of SiC, and 0.005 wt % to 1.0 wt % of Cu-CNT.

2. The lead-free solder alloy composition of claim 1, wherein the ceramic powder has a size of 10 μm or less.

* * * * *